Dec. 7, 1954  J. A. LOVE  2,696,068
SPRING TOOTH HARROW

Filed Aug. 20, 1948  4 Sheets-Sheet 1

INVENTOR.
JABEZ A. LOVE
BY
Oltsch & Knoblock
ATTORNEYS

Dec. 7, 1954   J. A. LOVE   2,696,068
SPRING TOOTH HARROW

Filed Aug. 20, 1948   4 Sheets-Sheet 2

INVENTOR.
JABEZ A. LOVE
BY
Oltsch + Knoblock
ATTORNEYS

Dec. 7, 1954   J. A. LOVE   2,696,068
SPRING TOOTH HARROW
Filed Aug. 20, 1948   4 Sheets-Sheet 3

INVENTOR
JABEZ A. LOVE.
BY
ATTORNEYS

Dec. 7, 1954   J. A. LOVE   2,696,068
SPRING TOOTH HARROW
Filed Aug. 20, 1948   4 Sheets-Sheet 4
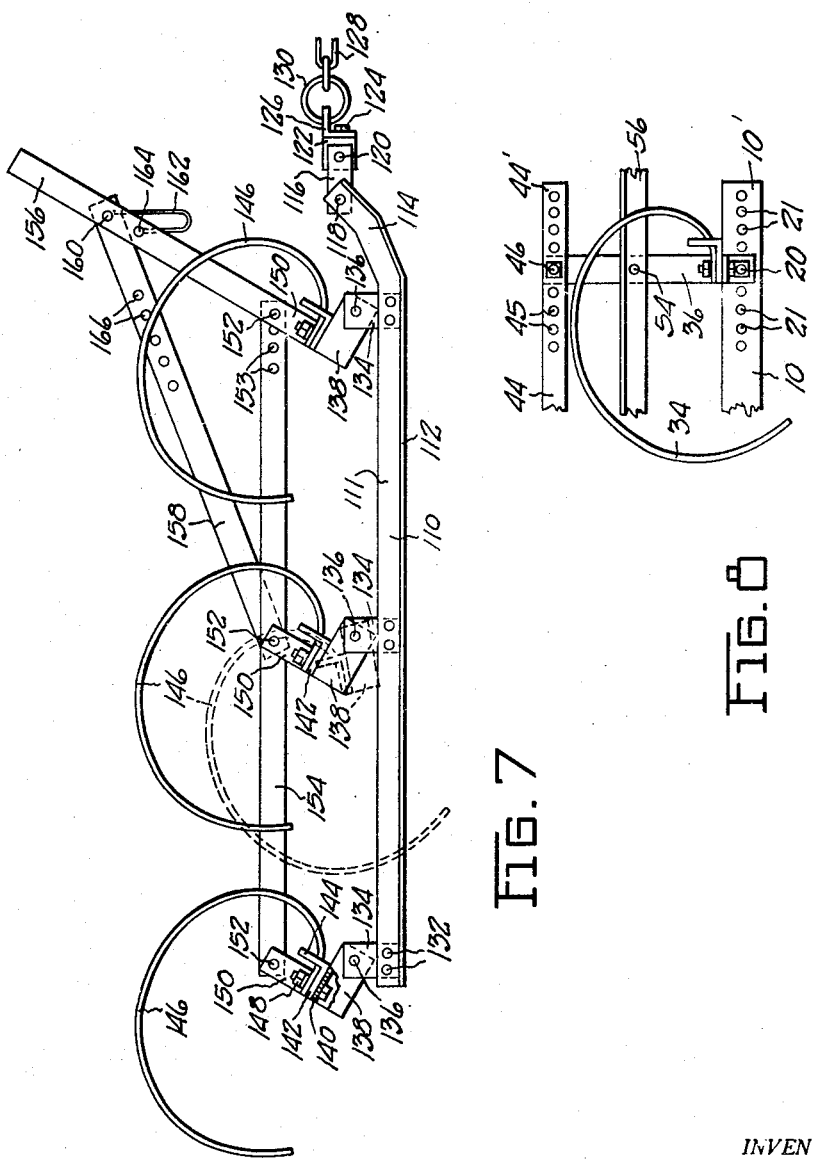
INVENTOR.
JABEZ A. LOVE
BY
Oltsch + Knoblock
ATTORNEYS.

United States Patent Office 2,696,068
Patented Dec. 7, 1954

2,696,068

SPRING TOOTH HARROW

Jabez A. Love, Silver Creek Township, Cass County, Mich.

Application August 20, 1948, Serial No. 45,404

5 Claims. (Cl. 55—130)

This invention relates to improvements in spring tooth harrows.

The primary object of the invention is to provide a harrow of this character, of simple, inexpensive and rugged construction, which is light in weight, readily adjustable, in which the number of parts is reduced to a minimum, and which may be made for connection with either a drawbar or a lift hitch mechanism mounted upon a tractive vehicle.

A further object is to provide a harrow of this character with rockably mounted front and rear tooth carrying members connected by a pair of vertically spaced substantially parallel bars, one of said bars having a fixed part projecting therefrom and adapted for connection with the other bar at a selected position relative to the length of the latter bar.

A further object is to provide a harrow of this character with a novel mounting for the spring teeth thereon.

A further object is to provide a harrow of this character which may be adjusted to position the spring teeth thereof clear of the ground, whereby the devices may be used as a ground levelling drag.

Other objects will be apparent from the following specification.

In the drawings:

Fig. 7 is a side view of another embodiment of the invention.

Fig. 8 is a fragmentary detail view illustrating the modification of the implement illustrated in Figs. 1 to 3.

Figure 1:
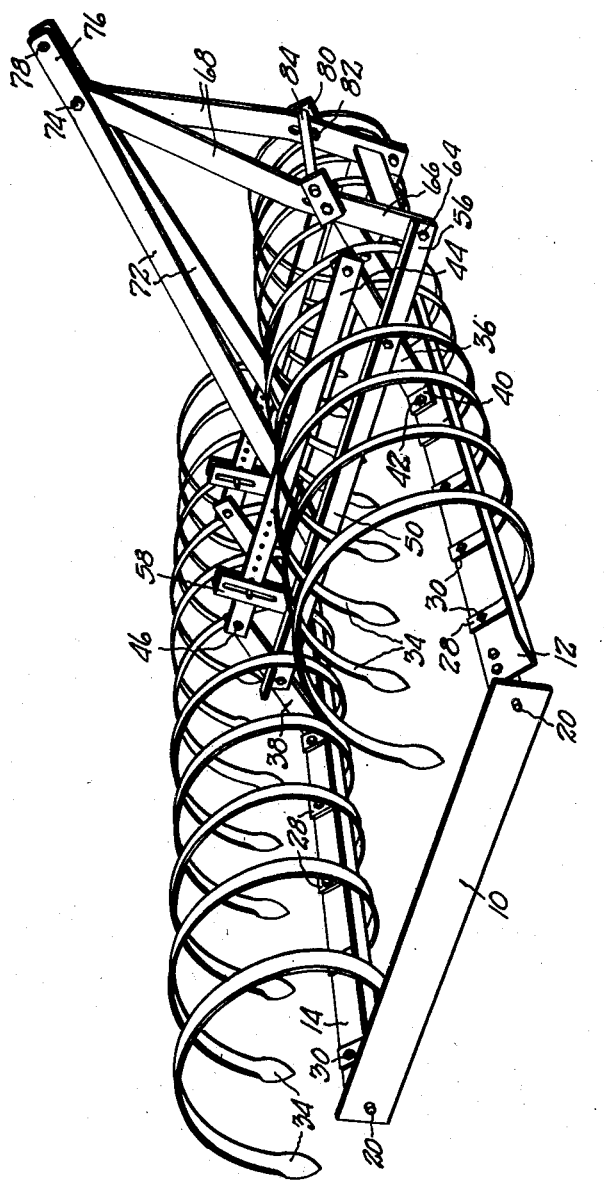
Fig. 1 is a front prospective view of the harrow provided with means for attaching it to a lift hitch mechanism.
Figure 2:
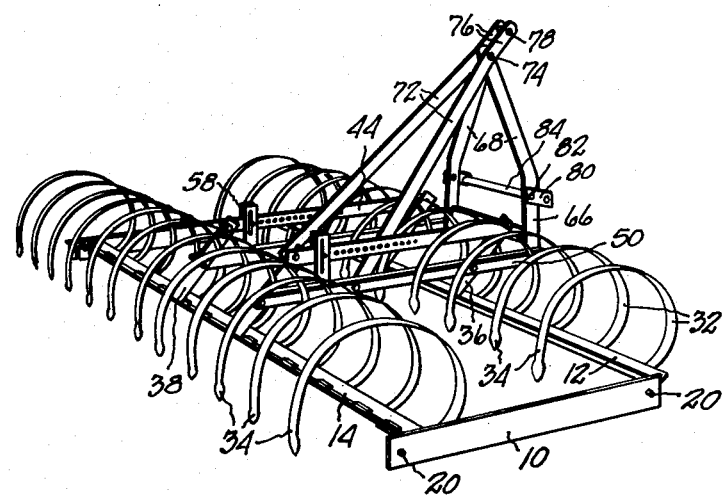
Fig. 2 is a rear perspective view of the harrow.
Figure 3:
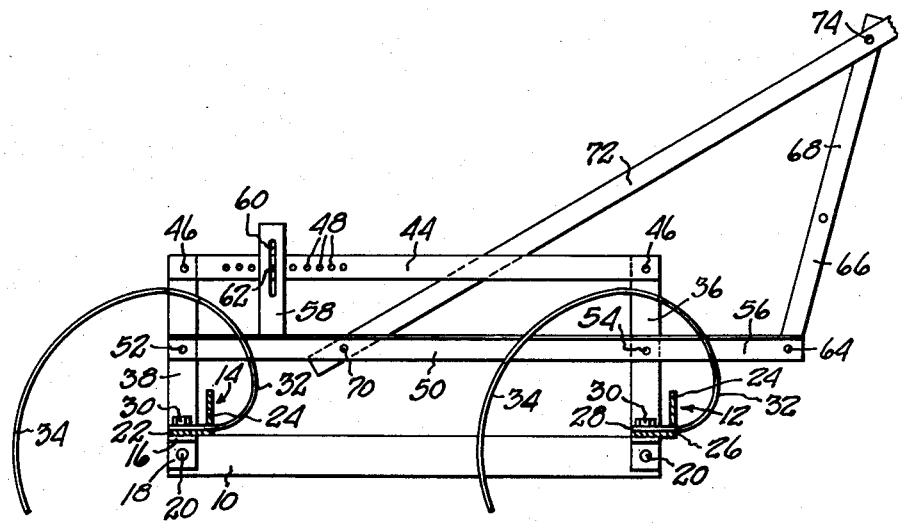
Fig. 3 is a side view of the device with one side bar removed and the frame crossbars shown in cross-section.
Figures 5, 6:
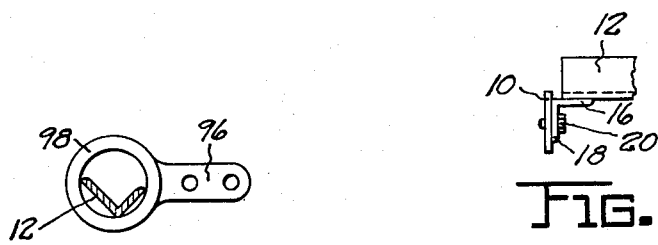
Fig. 5 is an enlarged sectional view taken on line 5—5 of Fig. 4.
Fig. 6 is an enlarged fragmentary detail front view illustrating the connection between the side bars and cross-bars of the harrow frame.

Referring to the drawings which illustrate the preferred embodiments of the invention, and particularly to Figs. 1 to 3 which illustrate the construction of a harrow adapted for connection with a power operated lift hitch of the three-arm type now commonly available upon tractors, the numeral 10 designates a pair of rigid elongated side bars or plates. A front crossbar 12 extends between and is connected to the front ends of the side bars 10, and a rear cross-bar 14 extends between and is connected to the rear ends of the side bars 10. As best illustrated in Fig. 6, the cross-bars 12 and 14 have the legs 16 of angle irons fixedly secured thereto at their opposite ends as by means of welding, bolts, rivets or other securing members, with the other leg 18 of said angle irons projecting laterally and perpendicularly from said cross-members and adapted for substantially flat bearing engagement with the adjacent side member 10. Bolts, rivets or other suitable securing means 20 serve to connect the angle iron legs 18 to the side bars 10 for relative angular or pivotal movement. Thus the crossbars 12 and 14 are free to rock relative to the side members 10, the axis of said rocking or rotative movement being parallel to the length of the crossbars. Each of the crossbars 12 and 14 preferably constitutes a rigid angle iron, as best seen in Fig. 3. The flanges or legs 22 of these angle irons have the flanges 16 of the pivot brackets secured thereto, and the flanges 24 project upwardly from the flanges 22 in the normal arrangement of the parts in forwardly offset relation to the pivot axis of the cross-members.

The flanges 24 of the angle irons have slots 26 formed therein and spaced uniformly along the length thereof. The slots in the front member 12 preferably are staggered relative to the slots in the rear angle iron 14. Spring teeth of any conventional construction, and preferably including a substantially flat terminal or connecting portion 28, extend through the slots 26 and lie generally in planes perpendicular to the crossbars 12 and 14. The slots 26 are formed with their lower edges substantially flush with the upper or inner surfaces of the flanges 22 of said crossbars and provide a flat bearing surface for engagement by the terminal portion 28 of each of the spring teeth. Bolts or other securing members 30 serve to connect the terminal portions 28 of the teeth to the flanges 22 of the crossbars. The spring teeth are curved on a short radius at 32 adjacent the terminal portion 28 thereof, and thereafter their curvature decreases progressively as illustrated in Fig. 3. It will be apparent that the teeth are firmly anchored to the crossbars, for which purpose the apertures 26 will be formed of a size to snugly receive the teeth portions 28 therein, and it will also be obvious that all teeth on each bar will be adjusted with reference to the vertical position of their free working or pointed end portions 34 thereof with respect to the side and crossbars of the frame as the crossbars are rocked about their pivot axes 20.

Each of the crossbars 12 and 14 has fixedly secured thereto a pair of upwardly projecting rigid arms preferably equally spaced from the mid-point of said crossbars. These bars constitute the front bars 36 and the rear bars 38 which preferably have perpendicularly bent flange portions 40 which are bolted or otherwise secured to the crossbars at 42. The front arms 36 are preferably spaced apart the same distance as the rear arms 38, and said arms are preferably longitudinally aligned. The upper or free ends of the arms 36 and 38 are connected by longitudinal rigid bars 44 pivotally connected thereto at 46. Each of the bars 44 has a plurality of longitudinally spaced apertures 48 formed therein.

Rigid longitudinal members 50, here shown as angle irons, are connected to the arms 36 and 38 intermediate the ends of the latter. The rear end of each of the members 50 is pivoted to a rear arm 38. An intermediate portion of each member 50 is pivoted to an intermediate portion of each arm 36 at 54, and the front portion 56 projects forwardly beyond the pivot point 54, for purposes to be mentioned hereinafter. Each of the members 50 fixedly mounts an upstanding rigid bracket 58. As here illustrated these brackets preferably comprise plates bent in U-shaped form which are of lengths to receive longitudinal members 44 between the opposite side parts thereof. Each of the brackets 58 has an elongated vertical slot 60 therein. Bolts or other suitable securing members 62 form removable means for connecting the brackets 58 with the longitudinal members 44. The bolts 62 are passed through a selected one of the apertures 48 and through the slot 60 and are then secured in place to prevent relative longitudinal movement. It will be observed that the members 36, 38, 44 and 50 thus define a pivoted or foldable parallelogram which may be adjusted to any selected angular relation and, when so adjusted, may be held fixedly by the securing members 62. By this means the front and rear crossbars are held at selected rocked or rotative position and the spring teeth are held in selected adjustment with respect to the frame.

In order to provide means for attachment of a power-operated lift hitch mechanism of the three-arm type, each of the members 50 has pivoted at its front and projecting end 64 a rigid bar or member 66. The upper end portions 68 of these bars converge upwardly and inwardly. In rearwardly spaced relation to the pivots 64 and preferably between the pivots 52 and 54 are pivoted at 70 the lower ends of elongated inclined rigid bars 72 which extend in upwardly converging relation. The members 66 and 72 intersect and are pivotally connected at 74 at their intersection. In the preferred form the members 72 pass outwardly relative to the members 66 and project forwardly and upwardly therebeyond at 76 in spaced relation and receive a cross-pin 78 at their free or upper ends. This cross-pin 78 serves as one connector to which one arm of a power-operated lift hitch may be connected.

Intermediate the height of the bars 66, and preferably at the lower and substantially parallel portions thereof, short links 80 are pivoted at one end at 82. The free or forward ends of the links 80 are interconnected by a cross-rod 84 which has a rotative or rocking fit relative thereto. The crossbar 84 is adapted to have connected to the opposite end portions thereof two lower or tension arms of a conventional three-arm power-operated lift mechanism.

This harrow has a number of outstanding advantages. The number of parts required in its fabrication is reduced to a minimum, which results in reduction of the weight of the harrow to a minimum. The parts are easily and quickly adjusted to control the setting of the spring teeth by simply changing the angular relation or setting of the parts 36, 38, 44 and 50 which constitute the parallelogram mentioned above. The unit is conditioned for such adjustment by the simple operation of removing the two securing members 62 and then replacing them after the adjustment is made at the openings or apertures 48 of the member 44 which correspond to the adjustment selected. This arrangement assures that the setting of the teeth of the front and rear sets will be equal and uniform.

The members 66 and 72 define a strong super-structure or A-frame which accommodates the attachment of the harrow to a lift hitch mechanism so that it may be lifted and lowered from the ground. The parts are all connected with sufficient rigidity that the harrow may be lifted as a unit to a position above ground level and yet, when lowered into working position, the parts have sufficient play and relative movement to facilitate following of the ground contour. This flexibility is further enhanced by the arrangement comprising the links 80 and the cross-rod 84 connected to the tension arms of the lift hitch and accommodating a substantial amount of rocking or lateral tilting of the implement relative to the tractor. It will be apparent that these units do not interfere with the lifting of the implement, however, by virtue of the fact that, although initial lifting movement of the arms which are connected with the cross-rod 84 is a free movement or lost motion which merely swings or pivots the links 80 relative to the members 66 which mount them, nevertheless after movement of these links through a predetermined arc, the cross-rod 84 is brought into engagement with the members 66 and further free movement or rotation thereof prevented so that the unit is conditioned for the lifting operation.

One of the advantages of this harrow is that it may be used for other than harrow purposes. Specifically, it may be used for ground levelling purposes. Thus it is possible, by adjusting the angle of the crossbars 12 and 14 to a position substantially as illustrated in Fig. 1, at which the tips 34 of the spring teeth are positioned at an elevation above the level of the bottom edges of the side arms 10 and the crossbars 12 and 14, to use the device for ground levelling purposes. Thus it will be apparent that when the harrow teeth are so adjusted and the harrow is lowered into contact with the ground, the crossbars 12 and 14 will serve as levelling bars for the purpose of levelling the surface of the ground as the harrow is pulled forwardly by the tractor. In this connection it will be seen that the curved end portions 32 may project slightly below the lowermost edge of the crossbars 12 and 14 but this downward projection is limited in extent so that it does not interfere with the levelling or dragging action but does serve the purpose of preventing the crossbars 12 and 14 from digging into the ground.

Figure 4:
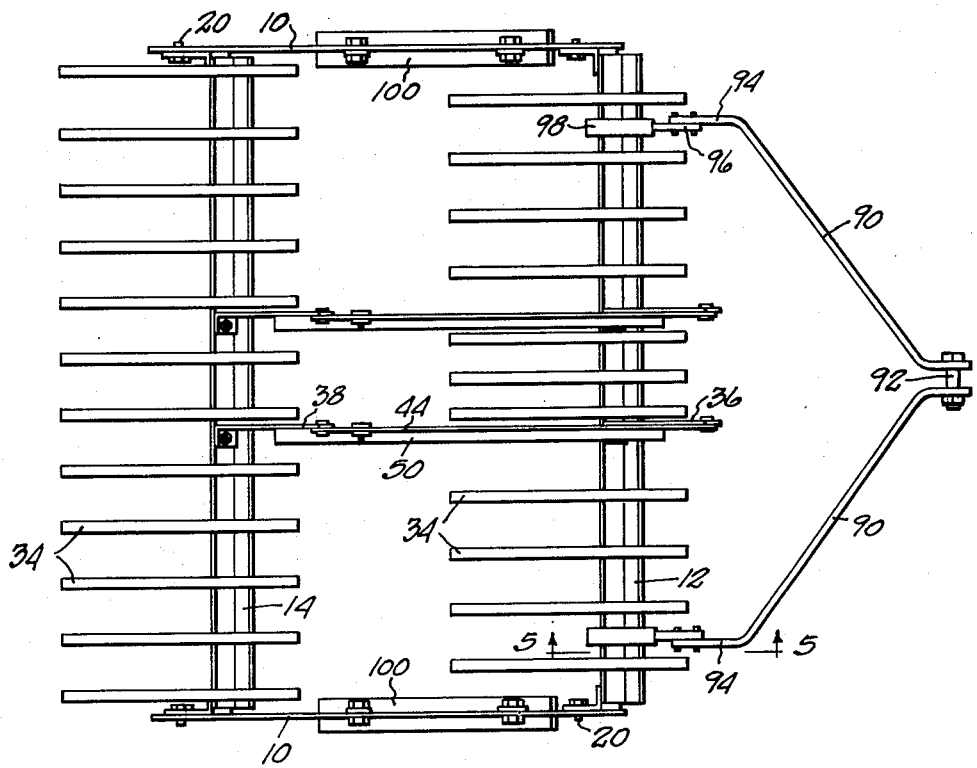
Fig. 4 is a top plan view of a harrow provided with a yoke for connecting it to the crossbar of a tractive vehicle.

Figs. 4 and 5 illustrate the harrow equipped with a yoke for connection with the drawbar of a tractor. A pair of yoke members 90 are connected together at their forward ends by a cross-pin 92. The yoke arms diverge rearwardly and outwardly from the pin 92 and preferably terminate in angularly rearwardly bent portions 94. The portions 94 mount or are connected to the arms 96 projecting from eye members or rings 98 which encircle the front crossbar 12 adjacent opposite ends thereof and preferably at points substantially equally spaced from the ends of the crossbar. Runners 100 are fixedly secured to the side bars 10 of the harrow and project therebelow for the purpose of regulating the position of the frame, and particularly the side bars, above ground level. Any suitable means may be employed to mount the runners 100 in desired position. Except for the use of the yoke 90 and the runners 100 and the omission of the A-frame members 66 and 72, the construction of the draw-bar harrow is the same in all respects as the construction of the lift type harrow illustrated in Figs. 1 to 3. It will be understood, however, that the means for connecting the yoke 90 to the harrow may be of different construction than that here illustrated, inasmuch as any connection which will permit the yoke to be swung vertically and to transmit the pull of the tractive vehicle to the harrow may be employed.

Another modified embodiment of the invention is illustrated in Fig. 7. The construction has been illustrated herein as adapted for a harrow of the drawbar or draft type as distinguished from the lift type, but may be embodied or used in an implement of the lift type if desired. As illustrated herein the harrow is provided with a plurality of longitudinally extending runners which preferably constitute angle irons having one flange or web 111 thereof disposed vertically and the other flange or web 112 thereof disposed horizontally. The forward ends of these runners are inclined forwardly and upwardly at 114. Links 116 are pivoted at 118 to the forward end portions 114 of the runners. The opposite or free end of each link 116 is pivoted at 120 to a rigid angle member 122 having a transversely extending leg or flange (not shown) to which is fixedly secured by bolts or other securing means 124 a rigid elongated crossbar 126, here shown as an angle iron. Draft means, such as a chain 128 adapted for attachment to a tractor or other tractive vehicle, are connected at a plurality of points along the length of rigid member 126 by any suitable means, such as the rings 130. It will be understood that a plurality of chains, cables or other draft members 128 will be provided which converge forwardly to an attachment point upon the tractor.

At a plurality of longitudinally spaced points thereof, each of the runners 110 has fixedly secured thereto, as by means of bolts 132, an upwardly projecting rigid plate 134. To the upper end of each plate 134 is pivoted at 136 one flange 138 of an angle bar whose opposite flange 140 is positioned uppermost. Elongated rigid transverse frame members are fixedly secured at spaced points thereof to the flanges 140 to connect the runners 110. The number of runners employed will depend upon the width of the implement and it will be understood that two or more will be employed as found suitable. The transverse members preferably constitute angle irons whose flanges 142 bear in flat face engagement with the flanges 140 of the angle irons 138 and whose opposite flange 144 is positioned forwardly and projects upwardly. The angle irons 142, 144 are preferably of the same construction as hereinbefore described and serve to mount fixedly and securely at spaced points along their length the spring teeth 146 which pass snugly through openings in the flanges 144 and have one end thereof fixedly anchored to the angle iron flange 142 by securing means 148 which may constitute bolt and nut units as shown. As here illustrated, the three transversely extending sets of spring teeth 146 are provided, although this number is illustrative and only two may be employed if desired, or, alternatively, more than three may be employed.

Each of the angle irons 142, 144 has fixedly secured to the flange 142 thereof in any suitable manner an upwardly extending arm 150. The upper ends of these arms are pivoted at 152 to longitudinally extending rigid members 154. The number of members 154 will preferably be the same as the number of runners 110, and the number of arms 150 will be equal to the number of plates 134 upon the runners. The front arms 150 are of greater length than the other arms and include handle portions 156 projecting above the adjacent frame member 154. A diagonal bar or brace 158 is pivoted at 160 to each handle portion 156 and extends downwardly and rearwardly for connection with the juxtaposed frame member 154 preferably at one of the pivots 152 of a rear set of spring teeth. The pivot 160 preferably constitutes a removable pin adapted to pass through openings in the handle 156 and the brace 158 when such openings are brought into register, said pin preferably being mounted upon a flexible cable or chain 162 anchored at 164 at one end of the handle member 156. The brace member 158 is preferably provided with a set of longitudinally spaced openings 166 therein to provide for adjustment of the harrow as selected, for example, adjustment between the full line position of the center spring tooth shown and the dotted line working position of that tooth.

It will be apparent that this construction possesses substantially the same advantages and features as the two constructions mentioned. The upper frame members 154 are held parallel to the runners 110 at all times, and as the handle 156 is swung to different angular positions and is anchored at such position by the pin or pins 160, the working position of the spring teeth will be varied accordingly between an elevated non-working position as shown in full lines and a lowered working position as shown in dotted lines. The pivotal movement of the handle entails a swinging of the members 138 between the upper full line position and the lower dotted line position, thus varying the elevation of the point of connection of each spring tooth relative to the runners 110 in addition to changing the angular position or working attitude thereof.

It will be understood that the harrow illustrated in Fig. 7 may be converted from a drawbar type of implement to a lift type implement by simply omitting therefrom the parts 116, 122, 126, 128 and 130 and attaching thereto a superstructure including the parts 66 and 72 as illustrated in Figs. 1 to 3, which superstructure will include connectors spaced vertically and transversely relative to each other for attachment of the three arms of a conventional three-arm lift hitch.

Each of the embodiments of the invention illustrated herein has been disclosed as providing adjustment of the working position of each of the spring teeth simultaneously. In addition thereto it may be desirable to provide for adjustment of one set of spring teeth relative to the other sets of the same implement. A construction which will accommodate such adjustment is illustrated in Fig. 8, wherein the parts shown bear the same reference numerals as Figs. 1 to 3. Essentially the difference in structure required to accommodate such individual adjustment is merely the elongation of the frame members 10 and 44 of Fig. 1, or the equivalent upper frame members of the other constructions, such as the frame members 154, compared to the lengths of such members as shown in the other figures of the drawing. Thus in Fig. 8 the member 44 is shown as provided with a projecting portion 44' and the member 10 with a projecting portion 10'. The portions of the members 10 and 44 adjacent to the pivot points 46 and 20, respectively, are provided with a set of longitudinally spaced apertures 45 and 21, respectively, adjacent each of the links 36. The pivot means 46 and 20 constitute removably mounted pins in this embodiment. Thus it will be apparent that, if the setting of any one set of teeth is to be varied or changed relative to or independently of the setting of the others, all that is required is the removal of the pins 46 and 20 in the embodiment shown in Figs. 1 to 3 and their replacement in a new set of openings 45 and 21, respectively, in the members 44 and 10.

In the Fig. 7 embodiment, the same advantage of individual adjustment of each set of spring teeth can be accomplished more simply. Thus a plurality of longitudinally spaced openings 153 may be formed in each of the longitudinal frame members 154 for selective connection by a removable pin 152 with the adjacent link 150. The setting in this case does not require a change in the setting or point of connection with the runner 110 because of the interposition of the pivots 136 between the runners 110 and the members 154.

In the embodiments of this spring harrow adapted for connection with a lift hitch of the type mounted upon a tractor and provided with a power actuating means for raising and lowering lift arms, changes necessary can be made in the superstructure and in the connection points. Hitches of this character commonly utilize three arms, including an upper compression arm and two lower laterally or transversely spaced tension arms. The upper arm of such a hitch is connected at the apex of the superstructure as at one of the connector pins 74 or 78. The two lower arms are connected to the opposite ends of the crossbar 84 in the form shown. This crossbar has a swing movement by reason of its mounting upon the superstructure by means of the pivoted links 80. This construction provides advantages in that a certain amount of flexibility occurs in the hitch connection and permits the implement to follow the contour of the ground freely. It is not essential, however, that this type of connection be provided and any other suitable means for connecting the two lower hitch arms of a three-point hitch to the lower part of the superstructure may be employed, such as connector pins or other means mounted fixedly upon the lower portions 66 of the superstructure. It will be understood, also, that the embodiments of the invention shown herein may be adapted for connection to a power operated lift hitch mechanism carried by a tractive vehicle and which employs either two lift arms or more than three lift arms. It will be obvious that the implements shown may be connected to a hitch of the two-arm type by providing attachment means for said arms upon the longitudinal members, as upon members 50 of the Fig. 1 embodiment or upon the members 154 of the Fig. 7 embodiment. Such attachment at member 50 will eliminate the necessity of the A-frame or frame superstructure of Fig. 1. Where the lift hitch has more than three arms, it is obvious that any change in the superstructure and frame required to provide a number of connectors equal to the number of hitch arms, and positioned properly for connection of the hitch arms, may be made.

While the preferred construction of the invention is illustrated and described herein, it will be understood that changes may be made therein within the scope of the appended claims without departing from the spirit of the invention.

I claim:

1. A spring tooth harrow comprising a substantially rectangular frame including rockable crossbars, ground-working tools carried by said crossbars, a pair of laterally spaced pivoted adjustable parallelogram structures connecting said crossbars and each including a pair of longitudinal parts and parts fixedly secured to said crossbars, a slotted rigid member fixed to one longitudinal part and adjustably secured to another part of such structure at one of a plurality of longitudinally spaced apertures in the latter for locking said structures in selected adjustment, a plurality of upwardly converging rigid members, connected together at their upper ends, one longitudinal part of each structure mounting a pair of said members at longitudinally spaced points, and spaced connectors carried by said last named members and adapted for connection with a hitch at multiple spaced points.

2. The construction defined in claim 1, wherein said parallelogram structures each include forwardly projecting longitudinal parts, and each said part mounting one of said last named members at its front end portion and the front mounted last named members carrying at least one connector.

3. The construction defined in claim 1, wherein one of said connectors comprises a transverse rod and a pair of rigid links each pivoted at one end at an intermediate point of one of said last named members and connected to said rod at its free end.

4. A spring tooth harrow comprising a plurality of rigid transverse members, a plurality of ground-working tools carried by each member, a set of rigid longitudinal members, a second set of rigid longitudinal members, each positioned spaced above a member of the first set, rigid arms connecting the members of adjacent sets and co-operating therewith to define a parallelogram, said transverse members being fixedly secured to said arms, a slotted rigid member fixed to one member of each set and adjustably connected to the other member at one of a longitudinal series of apertures in the latter for securing said longitudinal members and arms in predetermined angular relation to each other, a rigid superstructure secured to the longitudinal members of one set, said superstructure and the set of longitudinal members connected thereto constituting a rigid unit, and at least three connectors adapted for connection with a lift hitch each fixedly carried by said unit at least one of said hitch connectors being in transverse and vertically spaced relation to the other of said connectors.

5. In a spring tooth harrow having a frame including opposite side members, a plurality of elongated transverse members, a plurality of spring teeth fixedly secured to each transverse member, brackets carried by the ends of said transverse members and projecting perpendicularly therefrom, pivot members connecting said frame side members and said brackets about pivot axes parallel to said transverse members, two vertically spaced sets of longitudinal members spaced above said pivot axes, rigid members fixedly secured to said transverse members and pivoted to said last named members, a slotted rigid member fixed to one member of each set and adjustably secured to the other member at a selected one of a group of apertures in the latter for anchoring said last named members and transverse frame members in selected arrangement, a rigid superstructure carried by said last named members, and at least three connectors at the front of said superstructure for connection with a power-operated lift hitch, at least one of said hitch connectors being in transverse and vertically spaced relation to the other of said connectors.

References Cited in the file of this patent

UNITED STATES PATENTS

| Number | Name | Date |
|---|---|---|
| 214,667 | Kelles | Apr. 22, 1879 |
| 454,324 | Blaker | June 16, 1891 |
| 496,440 | Patten | May 2, 1893 |
| 518,912 | Brown | Apr. 24, 1894 |
| 842,239 | Parrett | Jan. 29, 1907 |
| 1,235,795 | Harris et al. | Aug. 7, 1917 |
| 1,540,549 | Earhart | June 2, 1925 |
| 1,561,849 | Gregg | Nov. 17, 1925 |
| 2,307,436 | Wadelton et al. | Jan. 5, 1943 |
| 2,333,586 | Rude | Nov. 2, 1943 |
| 2,354,850 | Cook et al. | Aug. 1, 1944 |

FOREIGN PATENTS

| Number | Country | Date |
|---|---|---|
| 24,212 | Sweden | Feb. 22, 1908 |
| 556,859 | Great Britain | Oct. 26, 1943 |